(12) United States Patent
Ertl

(10) Patent No.: US 10,940,745 B2
(45) Date of Patent: Mar. 9, 2021

(54) SEALING AND COVER STRIP FOR THE B-PILLAR OF A PASSENGER VEHICLE

(71) Applicant: Cadea Gesellschaft für Anwendung und Realisierung computerunterstützter Systeme mbH, Eichenau (DE)

(72) Inventor: Harald Ertl, Eichenau (DE)

(73) Assignee: CADEA GESELLSCHAFT FUR ANWENDUNG UND REALISIERUNG COMPUTERUNTERSTUTZTER SYSTEME MBH, Eichenau (DE)

( * ) Notice: Subject to any disclaimer, the term of this patent is extended or adjusted under 35 U.S.C. 154(b) by 57 days.

(21) Appl. No.: 16/081,227

(22) PCT Filed: Jan. 19, 2017

(86) PCT No.: PCT/EP2017/051022
§ 371 (c)(1),
(2) Date: Aug. 30, 2018

(87) PCT Pub. No.: WO2017/148613
PCT Pub. Date: Sep. 8, 2017

(65) Prior Publication Data
US 2019/0077239 A1    Mar. 14, 2019

(30) Foreign Application Priority Data
Mar. 4, 2016   (DE) .................... 10 2016 002 681.2

(51) Int. Cl.
*B60J 10/777*   (2016.01)
*B60R 13/04*   (2006.01)
(Continued)

(52) U.S. Cl.
CPC .......... *B60J 10/7775* (2016.02); *B29C 45/14* (2013.01); *B60J 10/45* (2016.02); *B60J 10/77* (2016.02);
(Continued)

(58) Field of Classification Search
None
See application file for complete search history.

(56) References Cited

U.S. PATENT DOCUMENTS 5,027,556 A * 7/1991 Ginster .................... B60J 10/78
49/441
5,067,281 A * 11/1991 Dupuy .................. B60J 5/0416
49/352
(Continued)

FOREIGN PATENT DOCUMENTS

DE      20304269 U1    6/2003
DE    102004041741 B3  6/2005
(Continued)

OTHER PUBLICATIONS

English translation of International Search Report for international application PCT/EP2017/051022, international filing date of Jan. 19, 2017, dated Apr. 26, 2017, 3 pages.
(Continued)

*Primary Examiner* — Marcus Menezes
(74) *Attorney, Agent, or Firm* — Cantor Colburn LLP

(57) ABSTRACT

The invention comprises a sealing and cover strip (8) for the B-pillar (7) of a passenger vehicle (1) comprising a support cover (10) and a decorative cover (9), each of which has a sealing half of a sealing profile for a lowerable side window on at least one of their common longitudinal sides. The present invention improves a sealing and cover strip (8) in such a way that the assembly effort during production of the vehicle is reduced and the optical appearance is improved.
(Continued)

This follows from the fact that each sealing profile (11, 12) comprises two sealing halves (13, 14 and 13', 14'), respective halves (13, 13') being integral with the decorative cover (9), and respective halves (14, 14') being integral with the support cover (10).

11 Claims, 4 Drawing Sheets

(51) Int. Cl.
| | | |
|---|---|---|
| *B60J 10/79* | (2016.01) | |
| *B60J 10/77* | (2016.01) | |
| *B60J 10/00* | (2016.01) | |
| *B29C 45/14* | (2006.01) | |
| *B29L 31/30* | (2006.01) | |

(52) U.S. Cl.
CPC ............... *B60J 10/79* (2016.02); *B60R 13/04* (2013.01); *B29L 2031/302* (2013.01)

(56) References Cited

U.S. PATENT DOCUMENTS

| | | | | |
|---|---|---|---|---|
| 5,092,078 | A * | 3/1992 | Keys | ........................ B60R 13/00 296/201 |
| 5,174,066 | A * | 12/1992 | Dupuy | ................... B60J 5/0416 49/377 |
| 5,345,718 | A * | 9/1994 | Dupuy | .................. E05F 11/385 49/441 |
| 5,860,692 | A * | 1/1999 | Nozaki | ................... B60J 10/246 296/146.9 |
| 6,103,168 | A * | 8/2000 | Kelly | ................ B29C 45/14336 156/245 |
| 6,817,651 | B2 * | 11/2004 | Carvalho | ............... B60J 10/235 296/146.15 |
| 7,434,867 | B2 * | 10/2008 | Matthies | .................. B60J 10/78 296/146.9 |
| 7,866,727 | B2 | 1/2011 | Fuetterer | |
| 8,388,039 | B2 | 3/2013 | Gerndorf et al. | |
| 2006/0150523 | A1 | 7/2006 | Matthies | |
| 2007/0094933 | A1 | 5/2007 | Matthies | |
| 2009/0001755 | A1 * | 1/2009 | Fuetterer | ................ B60J 5/0409 296/146.16 |
| 2009/0267373 | A1 | 10/2009 | Gerndorf et al. | |

FOREIGN PATENT DOCUMENTS

| | | | | |
|---|---|---|---|---|
| EP | 1695808 | A1 | 8/2006 | |
| EP | 2113422 | A1 | 11/2009 | |
| EP | 3118040 | A1 * | 1/2017 | .......... B60J 110/777 |
| GB | 2247489 | A | 3/1992 | |
| JP | 2002154323 | A | 5/2002 | |
| JP | 2006520293 | A | 9/2006 | |
| JP | 200996228 | A | 5/2009 | |

OTHER PUBLICATIONS

English Translation of Written Opinion for international application PCT/EP2017/051022, international filing date of Jan. 19, 2017, dated Apr. 26, 2017, 4 pages.

India Examination Report; India Application No. 201817034158; dated Dec. 17, 2019; 6 pages.

Japanese Office Action with English Translation; Japanese Application No. 2018-545488; dated Aug. 14, 2019; 5 pages.

\* cited by examiner

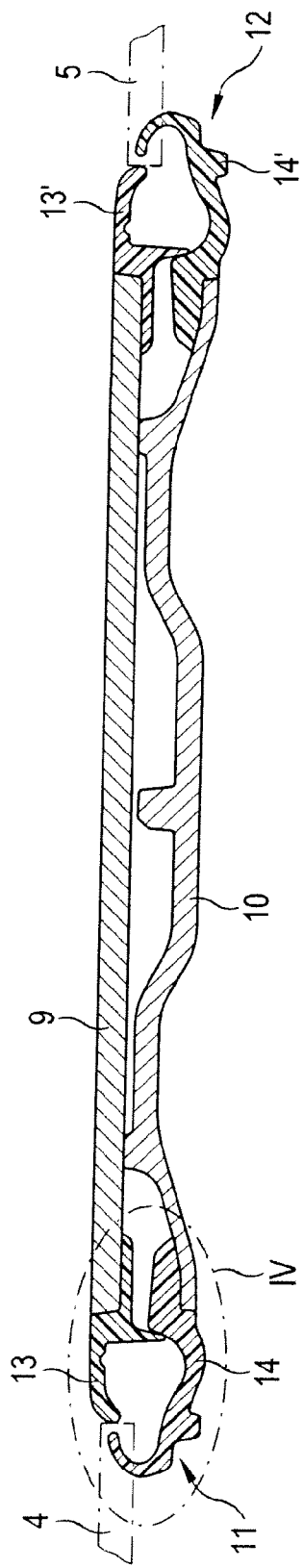
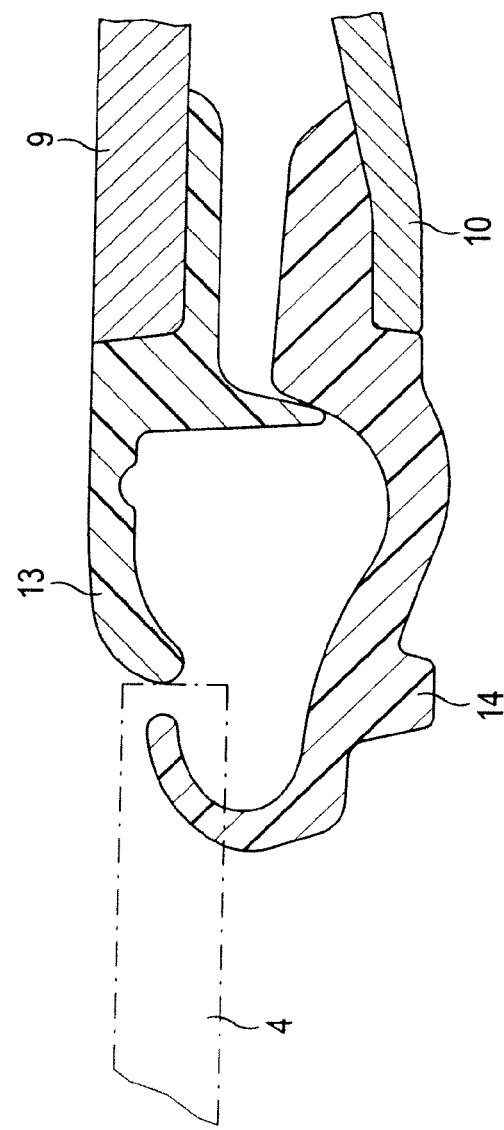
Fig. 3
Fig. 4

SEALING AND COVER STRIP FOR THE B-PILLAR OF A PASSENGER VEHICLE

CROSS-REFERENCE TO RELATED APPLICATIONS

This application is a U.S. national stage application of International Application No. PCT/EP2017/051022, which has an international filing date of 19 Jan. 2017, and which claims priority to German patent application number DE 10 2016 002 681.2, filed 4 Mar. 2016.

BACKGROUND OF THE INVENTION

Field of the Invention

The invention refers to a sealing and cover strip for the B-pillar of a two- or four-door passenger vehicle with frameless doors.

Description of Related Art

The B-pillar of a passenger vehicle is located between the front door and the rear door of a passenger vehicle, or in the case of a coupe between the side window of the front door and the rear movable or fixed side glazing of a passenger vehicle. In vehicles with frameless side windows, the seals are attached directly to the B-pillar. In these cases, the B-pillar usually has a support cover and a decorative cover, which together form a groove on the longitudinal side, which is assigned to a lowerable side window, into which groove a sealing profile is clipped in or inserted. Such a sealing strip is known from DE 10 2004 041 7 41 B3, for example. Inserting or clipping in the seal requires increased assembly effort. In addition, it can happen that, especially in older vehicles, the seals are no longer firmly seated, so that between the decorative strip of the B-pillar and the seal an optically unattractive gap can form which varies in size. The seal itself consists of two profiles and three vulcanized-on corners.

SUMMARY OF THE INVENTION

It is therefore the object of the present invention to design a sealing and cover strip of the type mentioned above in such a way that the assembly effort during manufacture of the vehicle is reduced, the optical appearance and quality are improved and the costs are reduced.

According to the invention, this object is solved by the features of claim 1. The cover now consists of two halves. The decorative cover including molded-on seal and the support cover with molded-on seal are joined to form a single component. The seal is no longer clipped into the groove formed between the support cover and the decorative cover; rather, the seal is divided into two halves, with one half connected to the decorative cover and the other half connected to the support cover. As soon as the support cover and decorative cover are connected, the two halves form a sealing profile which was previously made in one piece.

The respective seal halves of the seal can be connected to the decorative cover and the support cover by two-component injection molding in a particularly simple manner. For this purpose, only one of the mold halves has to be replaced during the injection process in order to inject the second component, here the elastomeric material for the seal.

It is particularly preferred if the side of one half of the seal facing the visible surface of the decorative cover merges into the visible surface of the decorative cover without gaps. If the color of the plastic material for the decorative cover and that of the half seal is chosen appropriately, there is hardly any difference between the seal and the decorative cover on the B-pillar.

An advantageous variant of the invention provides that seals are provided on both longitudinal sides and on the lower side of the support cover and decorative cover. In this way, the window of the rear vehicle door can also be frameless.

The assembly effort can be further reduced if corner pieces are provided at the upper end of the support cover, which merge into the window frame on the roof column of the passenger vehicle, whereby the end pieces are formed, allocated also partly on the support cover and partly on the decorative cover, by two-component injection molding.

In the same way, the seal halves can have end pieces at the lower end which are injection-molded integrally with the cover parts. Thus, all sealing elements as well as end and corner pieces are connected with a total of two parts. In an advantageous way, both parts, i.e. the decorative cover and the support cover, can be substance-to-substance bonded, for example by ultrasonic welding.

BRIEF DESCRIPTION OF THE DRAWINGS

In the following, an embodiment of the invention is explained in more detail on the basis of a drawing.

FIG. 3 shows a sectional view along the line III-Ill through the sealing and cover strip according to FIG. 2, FIG. 4 shows an enlarged detailed view of the detail IV from FIG. 3.

DETAILED DESCRIPTION OF THE INVENTION AND SPECIFIC EMBODIMENTS THEREOF

Figure 1:
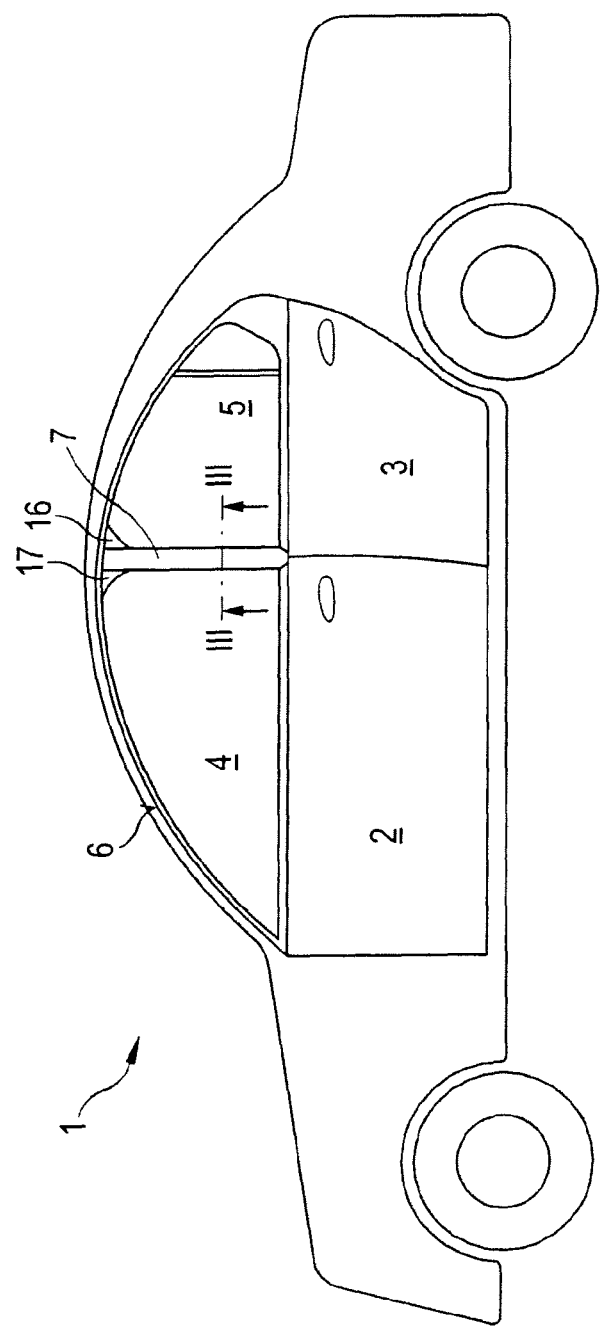
FIG. 1 shows a passenger vehicle with a B-pillar.
Figure 2:
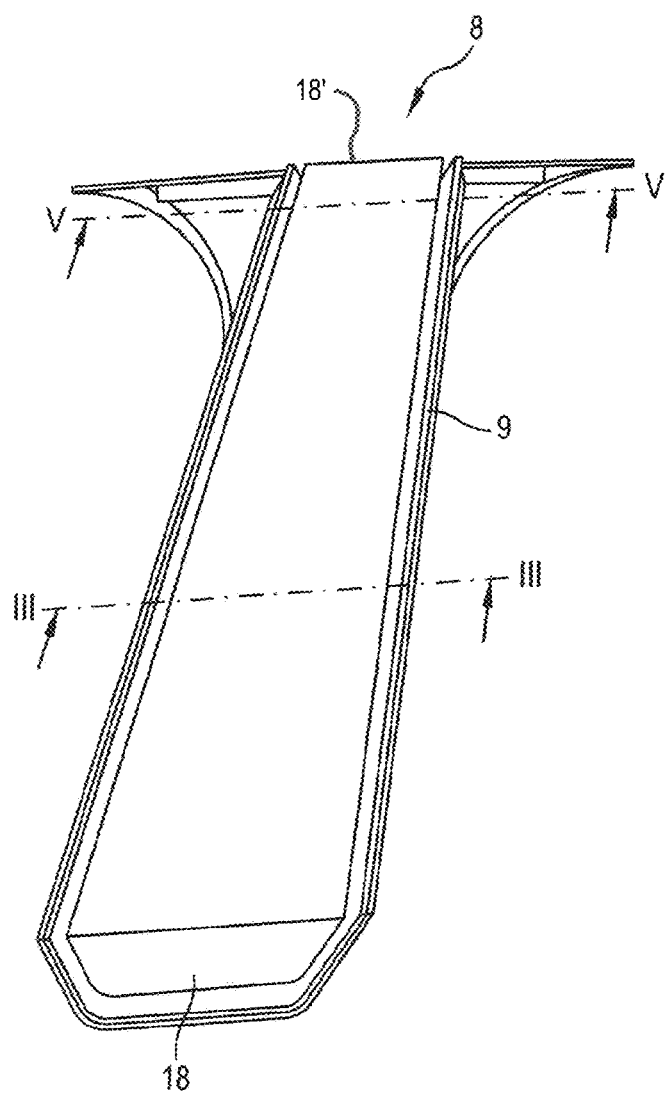
FIG. 2 shows a sealing and cover strip for a B-pillar according to FIG. 1.
Figure 5:
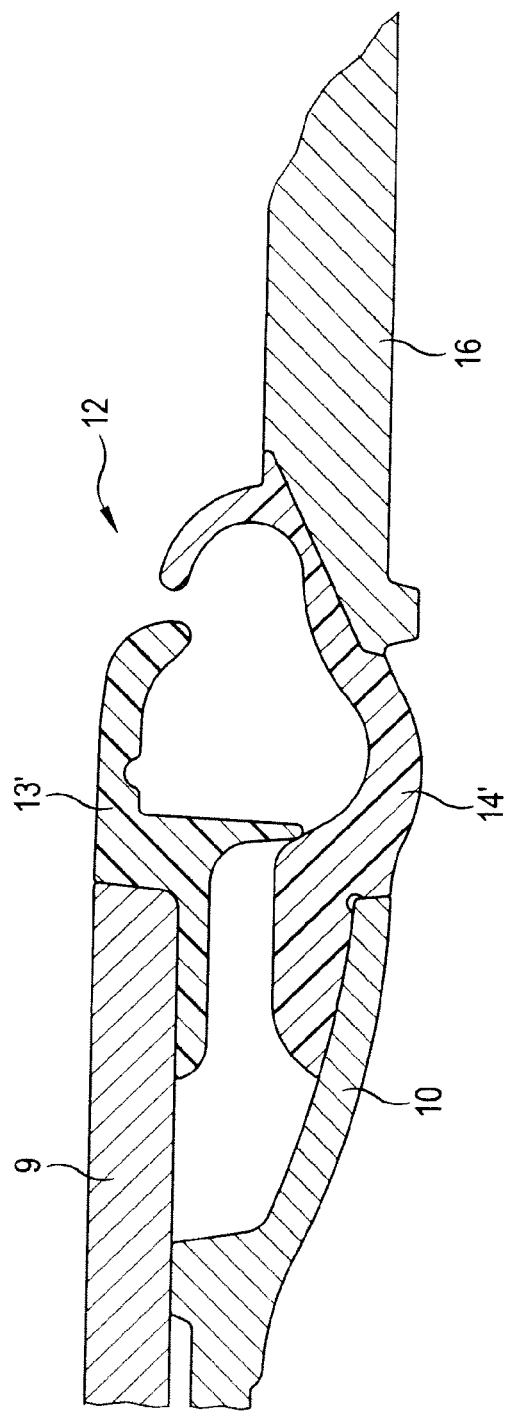
FIG. 5 shows in an enlarged detailed view a sectional view along Line V-V line through the sealing and cover strip according to FIG. 2.

The passenger vehicle shown in FIG. 1 is a vehicle which has a frameless window 4 and 5 both in the area of the front door 2 and in the area of the rear door 3. In the area of the roof column 6 and the door shafts, the windows 4 and 5 are sealed by known window edgings. In the area of the B-pillar 7, a sealing and cover strip 8 (FIG. 2) is provided for this purpose, which is shown in more detail in FIG. 2. When looking at FIG. 3, the sealing and cover strip 8 are seen to comprise an outer decorative cover 9, which faces the outside of the vehicle, and an underlying support cover 10, with which the sealing and cover strip 8 is fastened to the B-pillar of the vehicle. Seals 11 and 12 are provided for the side windows 4 and 5 on the common longitudinal sides of support cover 10 and decorative cover 9. These seals 11 and 12 each consist of two sealing halves 13 and 14 or 13' and 14', of which one half 13 or 13' is connected to the decorative cover and the other half 14 or 14' is connected to the support cover 10.

Corner pieces 16 and 17 are provided at the upper end of the sealing and cover strip 8, which form the transition from the sealing and cover strip 8 to the window edging 6 on the upper roof column. These corner pieces 16 and 17, as well as the sealing halves 14 and 14', are manufactured integrally with the support cover 10 by two-component injection molding. In the same way, the sealing halves 13 and 13' are connected integrally with the decorative cover 9, also by two-component injection molding.

In a similar manner, end pieces 18, 18' (FIG. 2) covering the door shaft are also molded onto the decorative cover 9 and the support cover 10. The decorative cover 9 and the support cover 10 are joined by ultrasonic or laser welding. Alternatively, both components can also be glued together.

The mode of action and function of the invention is explained in more detail below.

By separating the sealing profiles 11 and 12 into individual halves 13 and 14 or 13' and 14' as best seen in FIG. 3, it is possible to produce these individual halves integrally with, respectively, the decorative cover 9 and the support cover 10 by using two-component injection molding. By simply connecting the decorative cover 9 to the support cover 10, sealing profiles 11 and 12 are formed without the sealing profiles having to be subsequently threaded between the support cover and the decorative cover. Another advantage is that all other end and corner pieces 16, 17 and 18 can also be produced integrally with the decorative cover 9 and the support cover 10, so that only the decorative cover 9 has to be connected with the support cover 10 to complete the sealing and cover strip 8. In this way, the manufacturing process, and in particular the assembly of the sealing and cover strip, is significantly simplified. The use of suitable materials, such as friction-optimized, thermoplastic elastomers for the sealing function, means that the time-consuming and cost-intensive assembly processes of the previous system can be dispensed with.

The invention claimed is:

1. Sealing and cover strip for the B-pillar of a passenger vehicle having a roof column, the sealing and cover strip comprising a decorative cover and a support cover, the decorative cover being configured to face outwardly of the vehicle to thereby provide a visible surface of the sealing and cover strip, the support cover underlying the decorative cover and configured for fastening the sealing and cover strip to the B-pillar of the vehicle, wherein the decorative cover and the support cover cooperate to define respective opposite longitudinal sides of the sealing and cover strip, and a sealing profile for lowerable side windows is disposed on each of the opposite longitudinal sides, characterized in that the sealing profiles each consists of two separate sealing halves which are configured to contact and seal their respective associated lowerable side windows, one respective sealing half of each sealing profile being integral with the decorative cover and the respective other sealing half of each sealing profile being integral with the support cover.

2. Sealing and cover strip according to claim 1, characterized in that one of the sealing halves of the sealing profile is produced by two-component injection molding with the decorative cover to render that sealing half integral with the decorative cover and the other sealing half is produced by two-component injection molding with the support cover to render the other sealing half integral with the support cover.

3. Sealing and cover strip according to claim 1 or claim 2, characterized in that a side of one sealing half is disposed adjacent to the visible surface of the decorative cover and merges into the visible surface of the decorative cover without gaps.

4. Sealing and cover strip according to claim 1 or claim 2, characterized in that the support cover has an upper end which merges into a window edging on the roof column of the passenger vehicle, and corner pieces integral with the support cover are provided at the upper end of the support cover, and wherein the corner pieces are produced by two-component injection molding together with the support cover.

5. Sealing and cover strip according to claim 1 or claim 2, characterized in that the decorative cover has an upper end and a lower end, and end pieces integral with the decorative cover are provided at the upper end and at the lower end, wherein the end pieces are injection-molded integrally with the decorative cover.

6. Sealing and cover strip according to claim 1 or claim 2, characterized in that the decorative cover is bonded to the support cover.

7. Sealing and cover strip according to claim 3, characterized in that the sealing and cover strip comprises two respective ones of the sealing profile, one sealing profile being provided on each of the longitudinal sides.

8. Sealing and cover strip according to claim 3, characterized in that the support cover has an upper end which merges into a window edging on the roof column of the passenger vehicle, and corner pieces integral with the support cover are provided at the upper end of the support cover, and wherein the corner pieces are produced by two-component injection molding together with the support cover.

9. Sealing and cover strip according to claim 1, characterized in that the support cover has an upper end which merges into a window edging on the roof column of the passenger vehicle, wherein cover pieces integral with the support cover are provided at the upper end of the support cover and the corner pieces are produced by two-component injection molding together with the support cover.

10. Sealing and cover strip according to claim 3, characterized in that the decorative cover has an upper end and a lower end, and end pieces integral with the decorative cover are disposed at the upper end and at the lower end, and wherein the end pieces are injection-molded integrally with the decorative cover.

11. Sealing and cover strip according to claim 3, characterized in that the decorative cover is bonded to the support cover.

* * * * *